United States Patent

Jakob et al.

[11] Patent Number: 5,907,011
[45] Date of Patent: May 25, 1999

[54] HETEROGENEOUS POLYVINYL ESTER DISPERSIONS AND POWDERS

[75] Inventors: Martin Jakob; Detlev Seip, both of Kelkheim; Volker Matz, Frankfurt; Stefan Hess, Gross-Gerau, all of Germany

[73] Assignee: Clariant GmbH, Frankfurt, Germany

[21] Appl. No.: 08/828,557

[22] Filed: Mar. 31, 1997

Related U.S. Application Data

[63] Continuation of application No. 08/519,356, Aug. 25, 1995, abandoned.

[30] Foreign Application Priority Data

Sep. 2, 1994 [DE] Germany .............................. 44 313 43
May 22, 1995 [DE] Germany ........................ 295 08 505 U

[51] Int. Cl.$^6$ .................................................. C08L 31/04
[52] U.S. Cl. .................... 524/524; 524/459; 524/501; 524/503; 524/521; 524/523; 524/522; 524/516; 525/57; 525/203; 525/204; 525/205; 525/216; 525/217; 525/218; 525/220; 525/221; 525/222; 526/202; 526/319; 526/330; 526/331
[58] Field of Search ..................... 524/501, 503, 524/524, 459, 521, 522, 523, 516; 526/202, 319, 330, 331; 525/57, 203, 205, 204, 217, 216, 218, 220, 221, 222

[56] References Cited

U.S. PATENT DOCUMENTS

| | | | |
|---|---|---|---|
| 3,316,198 | 4/1967 | Van Gorder | 524/501 X |
| 3,598,677 | 8/1971 | Bergmeister et al. | 524/501 X |
| 3,714,105 | 1/1973 | Stehle et al. | 260/29.6 WA |
| 3,746,677 | 7/1973 | Arai et al. | 524/501 X |
| 3,853,686 | 12/1974 | Clendenin | 161/167 |
| 3,883,480 | 5/1975 | Matschke et al. | 524/503 X |
| 3,883,489 | 5/1975 | Matschke et al. | 526/331 X |
| 4,110,290 | 8/1978 | Mori et al. | 524/501 |
| 4,118,357 | 10/1978 | Brabetz et al. | 260/29.6 WA |
| 4,128,518 | 12/1978 | Oyamada et al. | 524/459 |
| 4,251,400 | 2/1981 | Columbus | 524/501 X |
| 4,350,782 | 9/1982 | Küchler et al. | 524/501 X |
| 4,350,788 | 9/1982 | Shimokawa et al. | 524/309 |
| 4,456,726 | 6/1984 | Siol et al. | 524/501 |
| 4,481,250 | 11/1984 | Cook et al. | 524/502 |
| 4,481,328 | 11/1984 | Herréus et al. | 524/493 |
| 4,521,561 | 6/1985 | Hausman et al. | 524/503 |
| 4,528,315 | 7/1985 | Eck et al. | 524/503 X |
| 4,746,579 | 5/1988 | Yannich et al. | 524/501 X |
| 5,041,482 | 8/1991 | Ornsteen et al. | 526/331 X |
| 5,110,856 | 5/1992 | Oyamada et al. | 524/503 X |
| 5,118,751 | 6/1992 | Schulze et al. | 524/503 |
| 5,296,532 | 3/1994 | Haerzschel et al. | 524/398 |
| 5,349,009 | 9/1994 | Furlan | 524/503 X |

FOREIGN PATENT DOCUMENTS

| | | |
|---|---|---|
| 1031887 | 5/1978 | Canada . |
| 1494508 | 12/1969 | Germany . |
| 38 39 936 | 5/1990 | Germany . |

OTHER PUBLICATIONS

*Wood Adhesives, Chemistry and Technology*, Marcel Dekker, 1: 331–333 (1989).
*Wood Adhesives, Chemistry and Technology*, Marcel Dekker, 2: 43–44 (1989).
*Chemical Abstracts*, abstract 56287s, 86: 46 (1977).
Patent abstract of JP 6–65550, 1994.
Patent abstract of JP 5–78541, 1993.

*Primary Examiner*—Judy M. Reddick
*Attorney, Agent, or Firm*—Foley & Lardner

[57] ABSTRACT

Heterogeneous, solvent- and plasticizer-free polyvinyl ester dispersions which are stabilized by protective colloids and which have a minimum filming temperature of below 10° C. are disclosed. These dispersions are made of a mixture of (a) a homopolymer or copolymer A having a glass transition temperature of above 20° C., whereby homopolymer or copolymer A includes
   (i) from 85 to 100% by weight of at least one vinyl ester of carboxylic acids having 1 to 18 carbon atoms;
   (ii) from 0 to 5% by weight of at least one α, β-unsaturated carboxylic acid;
   (iii) from 0 to 5% by weight of at least one mono-olefinically unsaturated compound (a3) having at least one amino or amido group, and
   (iv) from 0 to 5% by weight of at least one polyethylenically unsaturated monomer, and
(b) a copolymer B having a glass transition temperature of below 20° C., whereby copolymer B includes
   (i) from 45 to 98% by weight of at least one vinyl ester of carboxylic acids having 1 to 18 carbon atoms;
   (ii) from 2 to 50% by weight of at least on α-monoolefin having 1 to 4 carbon atoms and
   (iii) from 0 to 5% by weight of at least one polyethylenically unsaturated monomer. Also disclosed are powders obtained from these dispersions by spray-drying, and dispersion prepared by redispersing the spray-drying powders. These materials are suitable as adhesives for bonding porous and semiporous substrates.

23 Claims, No Drawings

HETEROGENEOUS POLYVINYL ESTER DISPERSIONS AND POWDERS

This application is a continuation of application Ser. No. 08/519,356, filed Aug. 25, 1995, now abandoned.

BACKGROUND OF THE INVENTION

1. Field of the Invention

The present invention relates to a heterogeneous polyvinyl ester dispersion stabilized by protective colloids and to a process for the preparation thereof. The invention also relates to a method of using a heterogeneous polyvinyl ester dispersion stabilized by protective colloids as a solvent- and plasticizer-free adhesive for bonding porous substrates.

2. Description of Related Art

Emulsion adhesives, which are often based on polyvinyl esters, are in practice frequently formulated with low- or high-boiling solvents. In their function as temporary plasticizers, the solvents serve as auxiliaries for film consolidation by lowering the minimum filming temperature or white point of the dispersions. This measure ensures that the adhesives can be processed even at temperatures only just above the freezing point of water. These adhesives have the advantage that they only have a slight adverse effect on the mechanical properties of the adhesive film, but they have a major disadvantage involving the release of solvents into the environment. A list of common solvents suitable for this purpose is provided, for example, in Wood Adhesives, Chemistry and Technology, Volume 1, Marcel Dekker, New York, 1989, pp. 332–333, and in Volume 2, p. 44.

A further function of the aforementioned solvents is to prevent coagulation of the dispersions when the adhesives are stored at low temperatures. The addition of low-boilers, such as methanol, ethanol and acetone, as antifreeze agents to polyvinyl acetate dispersions is described in Chemical Abstracts 86: 56287s.

Another group of relatively high-boiling compounds typically is added to the adhesive dispersions as permanent plasticizers. This group includes, for example, dibutyl phthalate and similar compounds. Although these remain in the film after drying, the heat stability of the adhesive bond and its resistance to cold flow can be impaired as a result of their use. A review of these compounds is likewise provided in Wood Adhesives, Chemistry and Technology, Volume 1, Marcel Dekker, New York, 1989, p. 331 and in Volume 2, p. 43–44.

A solvent- and plasticizer-free adhesive composition is therefore fundamentally of advantage with respect to environmental and user protection, since both toxicologically unacceptable substances and substances which cause an odor nuisance or environmental hazard on use can be omitted completely. It can therefore be used, in particular, in adhesive formulations described as "solvent-free".

Water-based adhesives in which the addition of film-forming auxiliaries or plasticizers is unnecessary due to internal plastification of the polyvinyl acetate by means of suitable comonomers, such as ethylene, are described in the patent literature. For example, DE-C 31 15 601 describes aqueous synthetic resin emulsions for use, for example, in an adhesive, paper-treatment composition or coating material, including polyvinyl acetate emulsion adhesives for wood which have good freezing resistance on storage at low temperatures. An emulsion adhesive for wood based on a copolymer of vinyl acetate and ethylene is also described. Low-temperature stability of the dispersions is principally achieved, without additional solvents, using acetoacetylated polyvinyl alcohols as protective colloids. The disclosure of DE-C 31 15 601 is incorporated by reference herein in its entirety.

DE-A 23 01 099 describes a process for the preparation of adhesive compositions based on terpolymers of vinyl acetate, ethylene and N-methylolacrylamide which are stabilized by partially hydrolyzed polyvinyl alcohol. The disclosure of DE-A 23 01 099 is incorporated by reference herein in its entirety. These polymers have improved resistance to cold flow and increased heat resistance of the adhesive bonds. These properties are achieved by carrying out the polymerization in a specific way, where the vinyl acetate and N-methylolacrylamide monomers are, in a delayed feed process, metered in such a way that the content of unpolymerized vinyl acetate in the batch as a whole does not exceed 1% at conversions of up to 75%.

It also is known to replace, in particular, the solvents used for frost protection by less-volatile compounds. For example, DE-A 38 39 936 describes frost-resistant emulsion adhesives based on polyvinyl esters which contain amides of aliphatic carboxylic acids and/or of carbamic acid, in particular acetamide. However, these formulations do not additionally contain plasticizers such as dibutyl phthalate or butyl diglycol acetate.

JP-A 78 541/93 describes polyvinyl acetate dispersions as wood and paper adhesives having a low filming temperature without addition of plasticizers. However, these compositions contain substantial amounts, for example 16% by weight, based on vinyl acetate, of a copolymer of isobutene and maleic anhydride as protective colloid in addition to polyvinyl alcohol.

DE-A 27 18 716 describes contact emulsion adhesives based on an ethylene-vinyl acetate copolymer that can be modified by the addition of an emulsion of an acrylate copolymer. However, the known high price of acrylates means that this modification considerably increases the cost of this emulsion adhesive.

JP-A 65550/94 describes an adhesive composition comprising a mixture of two vinyl acetate-ethylene copolymer dispersions with ethylene contents in the copolymer of, in each case from 5 to 40% by weight, of which one component is stabilized by means of polyvinyl alcohol and the other by means of nonionic emulsifiers. The presence of ethylene in both components and the presence of emulsifiers in at least one component results in adhesive bonds whose heat resistance is unsatisfactory.

A particular problem when using copolymers of vinyl acetate and ethylene which are stabilized using polyvinyl alcohol and which are prepared by conventional pressure emulsion polymerization processes with copolymerization with adequate amounts of ethylene to obtain the desired MFT values of below 7° C. is that the heat resistance of conventional polyvinyl ester homopolymer dispersion films containing film-forming auxiliaries is not achieved (see Comparative Examples V2 and V3 compared with comparative example V1 described herein). The documents described herein are incorporated by reference in their entirety.

SUMMARY OF THE INVENTION

An object of this invention is therefore to find an adhesive dispersion based on a vinyl ester, in particular vinyl acetate, as a monomer unit, which is stabilized essentially by using protective colloids and contains no low- or high-boiling solvents or plasticizers. It also is an object of the invention to provide such an adhesive dispersion which is comparable to conventional, solvent-modified polyvinyl ester homopolymer dispersions with respect to the applicational properties, such as heat resistance of the adhesive bonds, freeze/thaw stability of the dispersions and setting rate.

The foregoing objects and other objects readily apparent to those skilled in the art can be achieved in accordance with the invention by providing a heterogeneous dispersion comprising homopolymeric or copolymeric vinyl esters having different glass transition temperatures ($T_g$). The present invention therefore provides a solvent- and plasticizer-free, heterogeneous polyvinyl ester in dispersion or powder form which is stabilized essentially by means of protective colloids and has a minimum filming temperature of below 10° C., comprising a homopolymer or copolymer A having a glass transition temperature of above 20° C., whereby the homopolymer or copolymer A includes:

from 85 to 100% by weight of at least one vinyl ester of carboxylic acids having 1 to 18 carbon atoms (a1);

from 0 to 5% by weight of at least one $\alpha,\beta$-unsaturated carboxylic acid (a2);

from 0 to 5% by weight of at least one mono-olefinically unsaturated compound (a3) having at least one amino or amido group and from 0 to 5% by weight of at least one polyethylenically unsaturated monomer (a4), and a copolymer B having a glass transition temperature of below 20° C., whereby copolymer B includes:

from 45 to 98% by weight of at least one vinyl ester of carboxylic acids having 1 to 18 carbon atoms (b1);

from 2 to 50% by weight of at least one $\alpha$-mono-olefin having 1 to 4 carbon atoms (b2) and from 0 to 5% by weight of at least one polyethylenically unsaturated monomer (b3).

These and other objects of the present invention will be readily apparent to those skilled in the art upon review of the detailed description which follows.

DETAILED DESCRIPTION OF THE PREFERRED EMBODIMENTS

The ratio between polymers A and B in the heterogeneous dispersion or in the powder can be from 1:(0.05 to 2), preferably from 1:(0.15 to 1). The minimum filming temperature of the dispersion of the heterogeneous polyvinyl ester is preferably from 0 to 7° C.

Preferred group a1 monomers include, for example, vinyl esters of carboxylic acids having from 1 to 18, in particular 1 to 12, carbon atoms, vinyl formate, vinyl acetate, vinyl propionate, vinyl isobutyrate, vinylpivalate, and vinyl 2-ethylhexanoate, vinyl esters of saturated $\alpha$-branched monocarboxylic acids having 9 or 10 carbon atoms in the acid radical (®Versatic acids), and vinyl esters of relatively long-chain saturated or unsaturated fatty acids, such as vinyl laurate or vinyl stearate and vinyl esters of benzoic acid or p-tert.-butylbenzoic acid. Particular preference is given to vinyl acetate.

Examples of group a2 monomers include $\alpha,\beta$-unsaturated acids, such as acrylic acid, methacrylic acid, $\alpha,\beta$-unsaturated dicarboxylic acids, such as maleic acid, fumaric acid, itaconic acid and citraconic acid, and their primary monoamides to secondary monoamides or monoesters with in each case aliphatic, monohydric alcohols having 1 to 18, preferably 1 to 12, carbon atoms. Particularly preferred monomers are acrylic acid and methacrylic acid. Incorporation of the free acids improves the freeze/thaw stability of the dispersion mixtures.

Examples of the preferred compounds a3 include (meth) acrylamide, allyl carbamate, N-methylol(meth)acrylamide, N-methylolallyl carbamate and the N-methylol esters, N-methylolalkyl ethers or Mannich bases of N-methylol (meth) acrylamide or N-methylolallyl carbamate, acrylamidoglycolic acid, methyl acrylamidomethoxyacetate and N-(2,2-dimethoxy-1-hydroxyethyl)acrylamide. Further examples include N-dimethylaminopropyl(meth) acrylamide, N-methyl(meth)acrylamide, N-butyl(meth) acrylamide, N-cyclohexyl(meth)acrylamide,N-dodecyl (meth)acrylamide, N-benzyl(meth)acrylamide, N-p-hydroxyphenyl(meth)acrylamide, N-(3-hydroxy-2,2-dimethylpropyl)methacrylamide and ethylimidazolidone methacrylate, vinylpyrrolidone, N-vinylformamide and N-vinylacetamide. Particular preference is given to the N-methylolamides of acrylic acid and methacrylic acid. These comonomers enable water-resistant adhesives to be obtained in combination with acidic curing agents. Owing to their crosslinkable groups, they also increase the heat resistance of the dispersion mixture films (Examples 4 and 5).

Examples of group a4 monomers include diallyl phthalate, diallyl maleate, triallyl cyanurate, tetraallyloxyethane, divinylbenzene, 1,4-butanediol dimethacrylate, triethylene glycol dimethacrylate, divinyl adipate, allyl (meth)acrylate, vinyl crotonate, methylenebisacrylamide, hexanediol diacrylate, pentaerythritol diacrylate and trimethylolpropane triacrylate.

Preferred group b1 vinyl esters include the compounds mentioned under group a1, which may be identical or different to those used in polymer A. The vinyl ester employed for copolymer B is preferably the same as that used in polymer A, in particular vinyl acetate.

The group b2 monomer is in particular ethylene.

Suitable group b3 monomers include those compounds mentioned under a4, which may be identical to or different from those used in polymer A.

The glass transition temperature of copolymer A is preferably above 25° C., in particular at least 30° C. The glass transition temperature of the copolymer of component B is preferably below 15° C., in particular below 10° C.

Both copolymers A and B may be stabilized in the dispersion by the use of protective colloids, preferably by means of one or more polyvinyl alcohols, which have, in particular, a degree of hydrolysis of from 60 to 100 mol % and a viscosity of a 4% strength aqueous solution of from 2 to 70 mPa.s, measured at 20° C. The proportion by weight of the protective colloids based on the total weight of the particular copolymer composition, is preferably from 2 to 20% by weight, in particular from 5 to 15% by weight.

It is furthermore possible to use conventional anionic, nonionic or cationic emulsifiers as costabilizers, in an amount of up to 3% by weight, based on the total weight of the copolymer composition. Those skilled in the art are capable of using a stabilizing effective amount of protective colloid and emulsifiers depending on the particular copolymers produced.

The invention also relates to a process for preparing a heterogeneous, solvent- and plasticizer-free polyvinyl ester dispersion which is stabilized essentially by the use of protective colloids by mixing a dispersion comprising a homopolymer or copolymer A having a glass transition temperature of above 20° C., whereby homopolymer or copolymer A includes:

from 85 to 100% by weight of at least one vinyl ester of carboxylic acids having 1 to 18 carbon atoms (a1);

from 0 to 5% by weight of at least one $\alpha,\beta$-unsaturated carboxylic acid (a2);

from 0 to 5% by weight of at least one mono-olefinically unsaturated compound (a3) having at least one amino or amido group and from 0 to 5% by weight of at least one polyethylenically unsaturated monomer (a4), with a dispersion comprising a copolymer B having a glass transition temperature of below 20° C., whereby copolymer B includes:

from 45 to 98% by weight of at least one vinyl ester of carboxylic acids having 1 to 18 carbon atoms (b1), from 2 to 50% by weight of at least one α-mono-olefin having 1 to 4 carbon atoms (b2) and from 0 to 5% by weight of at least one polyethylenically unsaturated monomer (b3).

The dispersions of the homopolymeric or copolymeric vinyl esters A and B can be prepared by conventional continuous or batch free-radical emulsion polymerization or pressure emulsion polymerization processes. Those skilled in the art are familiar with free-radical emulsion polymerization or pressure emulsion polymerization and are capable of carrying out these processes using the guidelines provided herein.

The free-radical initiators useful in the process of the invention include water-soluble and/or oil-soluble initiator systems, such as peroxodisulfates, azo compounds, hydrogen peroxide, organic hydroperoxides or dibenzoyl peroxide. These can either be used alone or in combination with reducing compounds, such as Fe(II) salts, sodiumpyrosulfite, sodiumhydrogensulfite, sodium sulfite, sodium dithionite, ®Rongalit C (BASF, sodium formaldehyde sulfoxylate) or ascorbic acid as redox catalyst system.

The polyvinyl alcohol which can be used as the protective colloid can be present before the polymerization or can be added during or after the polymerization. The solids contents of dispersions A and B typically are in each case, independently of one another, from 25 to 65% by weight, and preferably are from 30 to 60% by weight.

When the polymerization is complete, the dispersions can be demonomerized by conventional chemical and/or physical methods in order to remove the majority of the residual monomers. Examples of such methods useful in the invention which may be mentioned are chemical aftertreatment at elevated temperatures with the abovementioned redox catalyst systems, stripping processes using inert gas or steam and distillation of the dispersions. The skilled artisan is capable of carrying out any of these methods in accordance with the guidelines provided herein.

The mixing of the two solvent- and plasticizer-free polyvinyl ester dispersions A and B can be carried out using conventional stirring equipment. The percentage ratio of the two polymers A and B in the dispersion mixture may be selected so that a minimum filming temperature (MFT) of below 10° C., preferably in the range of from 0 to 7° C., is obtained in the mixture of the dispersions of polymers A and B.

The mixing ratio required to establish the low MFT depends, in particular, on the glass transition temperature of polymers A and B in the individual dispersion components, on the type of acids a2 or N-functional comonomers a3 used in the polymer A, on the type and amount of the polyvinyl alcohols used for stabilization and on the particle size distributions of the dispersion components. The optimum ratio between the two polymers A and B in the dispersion mixture therefore typically is determined empirically in advance in each individual case by means of a mixture series. From 5 to 200 parts by weight, preferably from 15 to 100 parts by weight, in particular from 30 to 70 parts by weight, of polymer B are used per 100 parts by weight of polymer A.

When the mixing operation is complete, further additives, for example defoamers, fillers and preservatives, can subsequently be added to the dispersion.

The present invention furthermore relates to a process for the preparation of heterogeneous polyvinyl ester dispersion powders prepared by spray-drying the polyvinyl ester dispersions made in accordance with the invention described above, and the invention relates to a process for the preparation of heterogeneous polyvinyl ester dispersions by redispersing the polyvinyl ester dispersion powders in water.

The spray-drying can be carried out in any equipment known to the person skilled in the art and suitable for the spray-drying of liquids, for example having two-material nozzles or having a rotating atomizer disk.

Since the dispersion mixtures can have a very low minimum filming temperature, for example a MFT of 0° C., anti-caking agents should be used during spray drying to ensure a suitable shelf life of the dispersion powders. Suitable anti-caking agents include aluminum silicates, calcium carbonates or silicic acids having a mean particle size of from 0.01 to 0.5 μm. The anti-caking agents preferably are used in amounts of from 0.5 to 20% by weight, based on the solvents content of the dispersion mixtures. However, it also is possible, as described in DE-C 31 01 413, to employ hydrophobic silicic acids in the above amounts of from 0.1 to 3% by weight, based on the total amount of vinyl ester polymer and silicic acid. The anti-caking agent usually is introduced into the spray-drying tower simultaneously with, but separately from, the aqueous dispersion mixture.

The dispersion powders prepared in accordance with the invention have a good shelf life, are readily free-flowing and can rapidly be converted into homogenous, viscosity-stable dispersions with a long shelf life by stirring with water. The redispersions are excellent aqueous wood adhesives having good bond strengths comparable to those of conventional solvent-containing adhesives.

The novel heterogeneous polyvinyl ester dispersions are suitable as adhesives, in particular for the production of wood glues, for the preparation of specialty wood glues with increased water resistance and to the preparation of dispersion powders, redispersions of which are again solvent- and plasticizer-free adhesives.

The novel dispersions also have adhesive properties comparable to those of conventional solvent-containing adhesive dispersions, but do not contain greater amounts of volatile constituents in the form of low- or high-boiling organic solvents or plasticizers than may be regarded as technical-grade impurities.

Specifically, for the preparation of the novel solvent- and plasticizer-free specialty adhesives with increased water resistance of their bonds, the acidic compounds described in various patents, for example in DE-B 22 61 402, DE-C 26 20 738 and DE-A 39 42 628, in particular aqueous solutions of acidic salts, such as aluminum chloride, aluminum nitrate or zirconium oxychloride, or phosphoric acid, can be added as crosslinking catalysts to the novel dispersion. The disclosures of these documents are incorporated herein by reference in their entirety. These adhesives then satisfy at least strength class D2, preferably D3, of the EN 204 standard.

The present invention also relates to the use of the novel heterogeneous polyvinyl ester dispersions or redispersions of the novel spray-dried heterogeneous dispersion powders as adhesives for bonding porous or semiporous substrates, in particular wood.

The examples below serve to illustrate the invention. In the examples, parts and percentages are by weight.

Preparation of dispersion components A for Examples 1 to 8 and for Comparative Example VI Dispersions A1 and A2

A solution of 12 parts of partially hydrolyzed polyvinyl alcohol having a degree of hydrolysis of 88 mol % (composed of 6 parts of polyvinyl alcohol having a viscosity of the 4% strength aqueous solution of 8 mPa.s and 6 parts of polyvinyl alcohol having a viscosity of 4% strength aqueous solution of 18 mPa.s) in 95.5 parts of demineralized water was prepared in a stirred glass reactor fitted with anchor stirrer, inlet devices, reflux condenser, jacket heating and cooling and nitrogen inlet. An antifoam (®Agitan 280, Munzing-Chemie 0.1 part) was added, the reactor was flushed with nitrogen, and 5 parts of vinyl acetate were emulsified into the mixture. The internal temperature was raised to 50° C., the polymerization was commenced after addition of a solution of 0.03 part of tert-butyl hydroperoxide (70% strength, ®Trigonox AW 70, Akzo-Chemie) in 0.5 part of water and a linear feed was started over 3.5 hours of 0.04 part Rongalit C in 4.2 parts of water. After 20 minutes, two monomer feeds were started.

The first comprises 0.5 part of acrylic acid in 9.5 parts of water and the other comprises 94.5 parts of vinyl acetate in the case of dispersion A1 and 94.4 parts of vinyl acetate containing 0.1 part of trimethylolpropane triacrylate in the case of dispersion A2, each with 0.09 part by weight of tert-butyl hydroperoxide. Each feed was metered in over the course of 2.5 hours at an internal temperature of 69–73° C. When the feed of Rongalit C was complete, the mixture was post-polymerized in order to remove residual monomers, if necessary with subsequent addition of aqueous solutions of hydrogen peroxide (30%) and ascorbic acid. After cooling, the pH was adjusted to 5 using 10% strength sodium hydroxide solution. The viscosities of the dispersions at solids contents of 50% were 39.5 and 44.1 Pa.s, respectively (Brookfield RVT 6/20, 23° C.). The MFT values were in each case, 13° C.

Dispersion A3

A dispersion was prepared as described above, with the difference that the acrylic acid solution was replaced by a solution of 2 parts of N-methylolacrylamide in 13 parts of water. 93 parts of vinyl acetate were metered in, and only 92 parts of water were used in the liquor. (The comonomer solution was prepared by diluting a commercially available 48% strength solution of N-methylolacrylamide). No neutralization was carried out after completion of the polymerization. At a solids content of 48%, a viscosity of 21.1 Pa.s (Brookfield RVT 6/20, 23° C.) was obtained. The MFT was 13° C.

Dispersion A4

A 50% strength aqueous polyvinyl acetate dispersion having a latex viscosity of 12 Pa.s (Brookfield RVT 6/20, 23° C.) was prepared in the same apparatus as used for the preparation of dispersions A1 and A3 at a polymerization temperature of 70° C. using 8%, based on polyvinyl acetate, of a polyvinyl alcohol having a degree of hydrolysis of 88 mol % and a viscosity of the 4% strength aqueous solution at 20° C. of 18 mPa.s and 4%, based on polyvinyl acetate, of a polyvinyl alcohol having the same degree of hydrolysis, but a viscosity of the 4% strength aqueous solution at 20° C. of 8 mPa.s with the aid of 0.15%, based on polyvinyl acetate, of the catalyst ammonium persulfate. The MFT was 15° C.

Dispersion AV

A dispersion was prepared as described under dispersions A1 to A3, but without feed of comonomer, and using 95 parts of vinyl acetate in the monomer feed and 105 parts of water in the polymerization liquor. No subsequent neutralization was carried out. At a solids content of 49%, a viscosity of 27.5 Pa.s (Brookfield RVT 6/20, 23° C.) was obtained. The MFT was 13° C.

Dispersion components B for Examples 1 to 8 and Comparative Examples V2 and V3

Dispersion B1

A dispersion based on a copolymer of vinyl acetate and ethylene was prepared in a 30 l autoclave provided with metering devices, temperature control means and stirrer. The catalysis used the ammonium persulfate/Rongalit C system. The polymerization temperature was 80° C. Partially hydrolyzed polyvinyl alcohol (9.4%, based on the polymer) having a degree of hydrolysis of 88 mol % and a viscosity of 4% strength aqueous solution of 8 mPa.s at 20° C. was used in the polymerization liquor. In order to adjust the glass transition temperature of the film to about 10° C., the polymerization was carried out at the start under an ethylene pressure of 20 bar. The solids content was 50% by weight and the MFT was 0° C. The dispersion has a latex viscosity of 4.1 Pa.s (Brookfield RVT, 4/20, 23° C.).

Dispersion B2

A pressure emulsion polymer analogous to dispersion B1 was prepared with the difference that the polymerization was carried out under an initial ethylene pressure of 50 bar. The polymerization temperature was 60° C. The polymerization was carried out using 7%, based on the polymer, of a polyvinyl alcohol having a degree of hydrolysis of 88 mol % and a viscosity of the 4% strength aqueous solution at 20° C. of 8 mPa.s and 7%, based on the polymer, of a polyvinyl alcohol having a degree of hydrolysis of 88 mol % and a viscosity of the 4% strength aqueous solution at 20° C. of 4 mPa.s as protective colloid. The polymer had a glass transition temperature of about −10° C. Here too, the MFT was 0° C. The viscosity was 4 Pa.s (Brookfield RVT 4/20, 23° C.).

Dispersion B3

A 50% strength vinyl acetate-ethylene copolymer dispersion having a latex viscosity of 4 Pa.s (Brookfield RVT 4/20, 23° C.) and a glass transition temperature of the polymer of −14° C. was prepared in a 30 l pressure reactor with temperature control device and stirrer at a polymerization temperature of 60° C. and an ethylene pressure of 55 bar using 7%, based on the polymer, of a polyvinyl alcohol having a degree of hydrolysis of 88 mol % and a viscosity of the 4% strength aqueous solution at 20° C. of 8 mPa.s and 7%, based on the polymer, of a polyvinyl alcohol having a degree of hydrolysis of 88 mol % and a viscosity of the 4% strength aqueous solution at 20° C. of 4 mPa.s and 1%, based on the polymer, of a $C_{16}$–$C_{18}$-fatty alcohol which had been oxyethylated using 25 mol of ethylene oxide, with the aid of the ammonium persulfate/sodium pyrosulfite catalyst combination.

Dispersion for Comparative Example V2

A dispersion was prepared in the apparatus used for the preparation of dispersion B3 with the aid of 8.6%, based on the polymer, of partially hydrolyzed polyvinyl alcohol having a degree of hydrolysis of 88 mol % and a viscosity of the aqueous solution of 18 mPa.s at 20° C. and using the ammonium persulfate/Rongalit catalyst combination. The ethylene pressure was 30 bar, and the reaction temperature was 50° C. A coagulate-free dispersion having a solids content of 51.7% which had a viscosity of 9.6 Pa.s (Epprecht C/2, 23° C.) was obtained. The glass transition temperature was 13° C., the MFT had a value of 2.5° C.

Dispersion for Comparative Example V3

The procedure was as described under Comparative Example V2, but with the difference that the polymerization was carried out under an ethylene pressure of 20 bar. At a solids content of 52.4%, the viscosity was 10.9 Pa.s (Epprecht C/2, 23° C.). The glass transition temperature was 22° C. The MFT had a value of 5.5° C.

1. Preparation of solvent- and plasticizer-free wood adhesives

EXAMPLES 1 TO 5 AND COMPARATIVE EXAMPLE V1

In order to prepare example mixtures 1–5, the amounts by weight of base dispersions A1 to A3 shown in Table 1 were mixed with base dispersions B1 and B2 in a glass vessel with anchor stirrer, and the components were mixed thoroughly for at least 3 hours. In the case of Examples 4 and 5, aluminum chloride solution as a crosslinking catalyst was then added. In the case of Comparative Example V1, the dispersion AV was formulated in accordance with the prior art with the conventional film consolidator butyl diglycol acetate in order to reduce the MFT.

The analytical results and the results of applicational testing are shown in Table 1. The tear strengths of beechwood test specimens were determined in accordance with the EN 204 test standard. The test specimens were produced as described in EN 205. The glueing and testing was carried out taking into account the following technical parameters:

| | |
|---|---|
| Glue application rate: | from 150 ± 20 g/m² applied to both sides |
| Open waiting time: | 3 minutes |
| Closed waiting time: | 3 minutes |
| Pressing time: | 2 hours |
| Pressing pressure: | 0.7 ± 0.1 N/mm² |
| Number of test specimens per test run: | 20 |
| Testing after storage sequence D1/1: | 7 days standard climate*), |
| Testing after storage sequence D3/3: | 7 days standard climate*), 4 days in cold water (Test temperature: 23° C. ± 2° C.), |
| Testing after storage sequence D1/80° C.**): | 7 days standard climate*), 2 days storage at 80° C. (Test temperature: 80° C.), |
| Feed rate: | 50 mm/min. |

*) 23 ± 2° C. and 50 ± 5% relative atmospheric humidity
**) This test is not part of EN 204.

Classification in strength class D1 after storage sequence 1 took place at a tear strength of $\geq 10$ N/mm². Classification in strength class D3 after storage sequence 3 takes place at a tear strength of $\geq 2$ N/mm².

Determination of the setting rate

The setting rate was determined on single-overlapped beechwood test specimens produced by glueing two pieces of beechwood each with a thickness of 3 mm, a length of 85 mm and a width of 20 mm taking into account the following technical parameters:

| | |
|---|---|
| Pressing time: | 2.5 or 5 minutes |
| Pressing pressure: | 0.7 ± 0.1 N/mm² |
| Number of test specimens per test sequence: | 10 |
| Bonded area: | 300 mm² |
| Test temperature: | 23° C. ± 2° C. |
| Feed rate: | 50 mm/min. |

Freeze/thaw stability

The dispersions were stored at −18° C. for 24 hours, then slowly allowed to warm to room temperature again and assessed from their coating.

TABLE 1

| Example | 1 | 2 | 3 | 4 | 5 | V1 | V2 | V3 |
|---|---|---|---|---|---|---|---|---|
| Composition | | | | | | | | |
| Dispersion A1 [parts] | 100 | | | | | | | |
| Dispersion A2 [parts] | | 100 | 100 | | | | | |
| Diapersion A3 [parts] | | | | 100 | 100 | | | |
| Dispersion AV [parts] | | | | | | 100 | | |
| Dispersion B1 [parts] | 67 | | 67 | | 67 | | | |
| Dispersion B2 [parts] | | 43 | | 43 | | | | |
| Butyl diglycol acetate [parts] | | | | | | 2 | | |
| Aluminum chloride 28% [parts] | | | | 2.8 | 2.9 | | | |
| $T_g$ component A [° C.] | 30 | 30 | 30 | 30 | 30 | — | — | — |
| $T_g$ component B [° C.] | 10 | −10 | 10 | −10 | 10 | — | — | — |
| Testing | | | | | | | | |
| MFT [° C.] | 6 | 1 | 5 | 0 | 5 | 2 | 2.5 | 5.5 |

TABLE 1-continued

| Example | 1 | 2 | 3 | 4 | 5 | V1 | V2 | V3 |
|---|---|---|---|---|---|---|---|---|
| Visc. Brookfield RVT 6/20 [Pa · s] | 16.75 | 23.25 | 20.25 | 13 | 13.34 | 38.8 | — | — |
| Tear strength in accordance with EN 204 D1/1 [N/mm$^2$] | 13.5 | 10.4 | 12.9 | 11.4 | 12.8 | 12.8 | — | — |
| Tear strength in acc. with EN 204 D3/3 [N/mm$^2$] | — | — | — | 2 | 2.4 | — | — | — |
| Heat resistance D1/80° C. tear strength [N/mm$^2$] | 5.8 | 5 | 5.2 | 6.7 | 7.3 | 5.1 | 3.4 | 3.6 |
| Setting rate | | | | | | | | |
| Tear strength after a pressing time of 2.5 min. [N/mm$^2$] | 2 | 1.7 | 2.1 | 1.9 | 1.7 | 1.9 | — | — |
| Tear strength after a pressing time of 5 min. [N/mm$^2$] | 4 | 3.6 | 4 | 3.7 | 3.2 | 3.7 | — | — |
| Freeze/thaw stability at −18° C. | stable | stable | stable | stable | stable | coagulated | highly thickened | highly thickened |

Examples 1 to 5 according to the invention show that, in contrast to a conventional, prior-art polyvinyl acetate homopolymer dispersion in Example V1, to which the film-forming auxiliary butyl diglycol acetate has s been added, a comparable applicational property profile can be achieved at an MFT of from 0 to 6° C. In addition, in contrast to Example VI, the novel dispersion mixtures were freeze/thaw-stable without additional solvents. Comparative Examples V2 and V3 show that vinyl acetate/ethylene dispersions having a homogeneous polymer composition can not achieve adequate heat resistance of adhesive bonds at a comparable MFT, in contrast to the examples according to the invention.

2. Preparation of solvent- and plasticizer-free powder glues for wood

Example 6

Analogously to Examples 1 to 3, 100 parts of dispersion A1 were mixed with 67 parts of dispersion B2. This dispersion serves as the starting point for the spray-drying experiment described under Example 7. The adhesive-technical data are shown in Table 2.

Example 7

Spray-drying of the dispersion mixture from Example 6:

The dispersion mixture from Example 6 prepared from dispersions A1 and B2 was diluted with water to a solids content of 35% before the spray-drying. The drying unit used was a Niro ®Minor bench spray-dryer in which the atomization was achieved by means of a two-material nozzle at a nozzle pressure of 3 bar. The dispersion throughput was 1.5 l/hour, the air entry temperature was 130° C. and the gas exit temperature was 80° C. The anti-caking agent in the form of a hydrophobicized silicic acid was added separately from the dispersion with the aid of a metering screw. A readily free-flowing powder which was redispersable in water and had a good shelf life was obtained (ash at 1000° C.: 1.7%).

The technical characteristics of the 50% redispersion of this powder concerning glueing are listed in Table 2 for comparison with the starting dispersion.

Example 8

Spray-drying of the mixture of dispersions A4 and B3:

100 parts of dispersion A4 were mixed with 39 parts of dispersion B3 and adjusted with water to a solids content of 37% and a latex viscosity of 0.4 Pa.s (Epprecht rheometer B/II). The MFT of the dispersion mixture was below 0° C. The dispersion mixture was subsequently spray-dried in a conventional atomization tower, whose cylindrical part had a height of 1 m and a diameter of 2.2 m and whose conical part had an angle of 60 degrees. The dispersion was fed to the top of the tower and sprayed with the aid of an atomization disk with a diameter of 12 cm which contained 4 apertures, each having a diameter of 2.5 mm, and rotated at a speed of 2000 rpm. A mixture of nitrogen and hydrophobic silicon dioxide was blown into the tower through a further aperture in the tower cover at a nitrogen throughput of 1200 kg/h. The nitrogen was removed via a cyclone separator. The temperature of the nitrogen was 120° C. at the tower inlet and 75° C. at the separator. The silicon dioxide had a mean particle diameter of 28 nm, a surface area of 110 m$^2$/g and a carbon content of 2%. The pH of the 4% strength aqueous suspension of silicon dioxide was 7. The silicon dioxide was employed in an amount of 1%, based on the solids content of the dispersion mixture. The spray-drying proceeded without interruptions for several hours, and more than 90% of a readily free-flowing, low-dusting dispersion powder with a good shelf life was discharged via the cyclone discharge.

TABLE 2

| Example | 6 | 7 | 8 |
|---|---|---|---|
| Composition | | Redispersion | Redispersion |
| Dispersion A1 [Parts] | 100 | 100 | |
| Dispersion A4 [Parts] | | | 100 |
| Dispersion B2 [Parts] | 67 | 67 | |
| Dispersion B3 [Parts] | | | 39 |
| T$_g$ component A [° C.] | 30 | 30 | 30 |
| T$_g$ component B [° C.] | −10 | −10 | −14 |

TABLE 2-continued

| Example | 6 | 7 | 8 |
|---|---|---|---|
| Testing | | | |
| Solids content [%] | 50 | 50 | 53 |
| MFT [° C.] | 0 | 0 | 0 |
| Visc. Brookfield RVT 6/20 [Pa · s] | 16.50 | 18 | 12 |
| Tear strength in acc. with EN 204 D1/1 [N/mm$^2$] | 14 | 15.3 | 15 |
| Tear strength in acc. with EN 204 D3/3 [N/mm$^2$] | — | — | — |
| Heat resistance D1/80° C. tear strength [N/mm$^2$] | 3.6 | 3.7 | 5 |
| Setting rate | | | |
| Tear strength after a pressing time of 2.5 minutes [N/mm$^2$] | 2.1 | 1.6 | 2.7 |
| Tear strength after a pressing time of 5 minutes [N/mm$^2$] | 3.6 | 4.3 | 3.9 |
| Freeze/thaw stability at 18° C. | stable | stable | stable |

It is clear from Table 2 that the spray-dried, solvent- and plasticizer-free dispersion mixture from Example 6 can be converted in Example 7 into a redispersion which does not differ significantly in adhesive strength from the sprayed starting dispersion. Example 8 shows that, in addition to the good strength of the wood bonds, a good setting rate, in particular, can also be achieved with the novel adhesives made from redispersed dispersion powders.

While the invention has been described with reference to particularly preferred embodiments, those skilled in the art appreciate that various modifications can be made to the invention without significantly departing from the spirit and scope thereof.

What is claimed is:

1. A heterogeneous, solvent- and plasticizer-free polyvinyl ester in dispersion or powder form which is stabilized by protective colloids and has a minimum filming temperature of below 10° C., comprising:
   (a) a homopolymer or copolymer A having a glass transition temperature of above 20° C., said homopolymer or copolymer A consisting of:
      (i) from 85 to 100% by weight of monomer units of at least one vinyl ester of carboxylic acids having 1 to 18 carbon atoms (a1);
      (ii) from 0 to 5% by weight of monomer units of at least one α, β-unsaturated carboxylic acid (a2);
      (iii) from 0 to 5% by weight of monomer units of at least one mono-olefinically unsaturated compound (a3) having at least one amino or amido group and
      (iv) from 0 to 5% by weight of monomer units of at least one polyethylenically unsaturated compound (a4), each based on the total amount of said homopolymer or copolymer A and
   (b) a copolymer B having a glass transition temperature of below 20° C., said copolymer B comprising:
      (i) from 45 to 98% by weight of monomer units of at least one vinyl ester of carboxylic acids having 1 to 18 carbon atoms (b1);
      (ii) from 2 to 50% by weight of monomer units of at least one α-mono-olefin having 1 to 4 carbon atoms (b2) and
      (iii) from 0 to 5% by weight of monomer units of at least one polyethylenically unsaturated compound (b3), each based on the total amount of said copolymer B.

2. A heterogeneous polyvinyl ester as claimed in claim 1, wherein the ratio of polymer A to polymer B is from 1:0.05 to 1:2.

3. A heterogeneous polyvinyl ester as claimed in claim 1, wherein the minimum filming temperature is in the range of from 0 to 7° C.

4. A heterogeneous polyvinyl ester as claimed in claim 1, wherein the glass transition temperature of polymer A is above 25° C. and the glass transition temperature of polymer B is below 15° C.

5. A heterogeneous polyvinyl ester as claimed in claim 1, wherein the vinyl ester in the polymers A and B, (a1) and (b1), respectively, is in each case vinyl acetate and wherein the α-mono-olefin in the polymer B, (b2), is ethylene.

6. A heterogeneous polyvinyl ester as claimed in claim 1, wherein polymer A contains comonomer units selected from the group consisting of acrylic acid, methacrylic acid, N-methyloacrylamide and N-methylolmethacrylamide.

7. A heterogeneous polyvinyl ester as claimed in claim 1, wherein polymers A and B are each stabilized by from 2 to 20% by weight of polyvinyl alcohol, based on the total weight of the particular polymer composition.

8. A heterogeneous polyvinyl ester as claimed in claim 1, wherein the a1 monomers are selected from the group consisting of vinyl formate, vinyl acetate, vinyl propionate, vinyl isobutyrate, vinylpivalate, vinyl 2-ethylhexanoate, vinyl esters of saturated α-branched monocarboxylic acids having 9 or 10 carbon atoms, vinyl laurate, vinyl stearate, and vinyl esters of benzoic acid or p-tert-butylbenzoic acid.

9. A heterogeneous polyvinyl ester as claimed in claim 1, wherein the group a2 monomers are selected from the group consisting of α, β-unsaturated acids, α, β-unsaturated dicarboxylic acids, primary monoamides of α, β-unsaturated dicarboxylic acids, secondary monoamides of α, β-unsaturated dicarboxylic acids, monoesters of α, β-unsaturated dicarboxylic acids and mixtures thereof.

10. A heterogeneous polyvinyl ester as claimed in claim 9, wherein the α, β-unsaturated acids are selected from the group consisting of acrylic acid, methacrylic acid and mixtures thereof.

11. A heterogeneous polyvinyl ester as claimed in claim 9, where, in the α, β-unsaturated dicarboxylic acids, the primary monoamides of α, β-unsaturated dicarboxylic acids, the secondary monoamides of α, β-unsaturated dicarboxylic acids, and the monoesters of α, β-unsaturated dicarboxylic acids, the dicarboxylic acids are selected from the group consisting of maleic acid, fumaric acid, itaconic acid, citraconic acid and mixtures thereof.

12. A heterogeneous polyvinyl ester as claimed in claim 1, wherein the group a3 monomers are selected from the group consisting of (meth)acrylamide, allyl carbamate, N-methylol(meth)acrylamide, N-methylolallyl carbamate and the N-methylol esters, N-methylolalkyl ethers or Mannich bases of N-methylol(meth)acrylamide or N-methylolallyl carbamate, acrylamidoglycolic acid, methyl acrylamidomethoxyacetate, N-(2,2-dimethoxy-1-hydroxyethyl)acrylamide, N-dimethylaminopropyl(meth)-acrylamide, N-methyl(meth)acrylamide, N-butyl(meth)-acrylamide, N-cyclohexyl(meth)acrylamide, N-dodecyl-(meth)acrylamide, N-benzyl (meth) acrylamide, N-p-hydroxy-phenyl(meth)acrylamide, N-(3-hydroxy-2,2-dimethylpropyl)-methacrylamide, ethylimidazolidone methacrylate, vinylpyrrolidone, N-vinylformamide, N-vinylacetamide and mixtures thereof.

13. A heterogeneous polyvinyl ester as claimed in claim 1, wherein the group a4 monomers are selected from the group consisting of dialkyl phthalate, diallyl maleate, triallyl cyanurate, tetraallyloxyethane, divinylbenzene, 1,4-butanediol dimethacrylate, triethylene glycol dimethacrylate, divinyl adipate, allyl (meth)acrylate, vinyl crotonate, methylenebisacrylamide, hexanediol diacrylate, pentaerythritol diacrylate, trimethylolpropane triacrylate and mixtures thereof.

14. A heterogeneous polyvinyl ester as claimed in claim 1, wherein the group b1 monomers are selected from the group consisting of vinyl formate, vinyl acetate, vinyl propionate, vinyl isobutyrate, vinylpivalate, vinyl 2-ethylhexanoate, vinyl esters of saturated α-branched monocarboxylic acids having 9 or 10 carbon atoms, vinyl laurate, vinyl stearate and vinyl esters of benzoic acid or p-tert-butylbenzoic acid.

15. A heterogeneous polyvinyl ester as claimed in claim 1, wherein the group b2 monomer is ethylene.

16. A heterogeneous polyvinyl ester as claimed in claim 1, wherein the group b3 monomers are selected from the group consisting of diallyl phthalate, diallyl maleate, triallyl cyanurate, tetraallyloxyethane, divinylbenzene, 1,4-butanediol dimethacrylate, triethylene glycol dimethacrylate, divinyl adipate, allyl (meth)acrylate, vinyl crotonate, methylenebisacrylamide, hexanediol diacrylate, pentaerythritol diacrylate and trimethylolpropane triacrylate.

17. A process for the preparation of a heterogeneous polyvinyl ester in dispersion form as claimed in claim 1 comprising:

mixing a dispersion comprising (a) a homopolymer or copolymer A having a glass transition temperature of above 20°, said homopolymer or copolymer A consisting of:
  (i) from 85 to 100% by weight of monomer units of at least one vinyl ester of carboxylic acids having 1 to 18 carbon atoms (a1);
  (ii) from 0 to 5% by weight of monomer units of at least one α, β-unsaturated carboxylic acid (a2);
  (iii) from 0 to 5% by weight of monomer units of at least one mono-olefinically unsaturated compound (a3) having at least one amino or amido group, and
  (iv) from 0 to 5% by weight of monomer units of at least one polyethylenically unsaturated compound (a4), each based on the total amount of said homopolymer or copolymer A, with (b) a dispersion comprising a copolymer B having a glass transition temperature of below 20° C., said copolymer B comprising:
  (i) from 45 to 98% by weight of monomer units of at least one vinyl ester of carboxylic acids having 1 to 18 carbon atoms (b1);
  (ii) from 2 to 50 by weight of monomer units of at least one α-mono-olefin having 1 to 4 carbon atoms (b2) and
  (iii) from 0 to 5% by weight of monomer units of at least one polyethylenically unsaturated compound (b3), each based on the total amount of said copolymer B.

18. A process as claimed in claim 17, wherein said dispersions of homopolymers or copolymers A and B are further spray-dried after mixing so as to form a powder.

19. A process as claimed in claim 18, wherein said powder comprising homopolymers or copolymers A and B are redispersed in water after spray-drying.

20. An adhesive for bonding porous or semiporous substrates comprising a heterogeneous polyvinyl ester dispersion as claimed in claim 1.

21. A solvent- and plasticizer-free heterogeneous polyvinyl ester according to claim 1, in powder form.

22. A heterogenous polyvinyl ester as claimed in claim 1, wherein said homopolymer or copolymer A is a copolymer comprising monomer units selected from the group consisting of α, β-unsaturated carboxylic acids (a2) and monolefinically unsaturated compounds (a3) having at least one amino or amido group.

23. A process as claimed in claim 17, wherein said homopolymer or copolymer A is a copolymer comprising monomer units selected from the group consisting of α, β-unsaturated carboxylic acids (a2) and monolefinically unsaturated compounds (a3) having at least one amino or amido group.

* * * * *